US012687400B2

(12) United States Patent　(10) Patent No.: US 12,687,400 B2
Okada et al.　(45) Date of Patent: Jul. 21, 2026

---

(54) INFORMATION PROCESSING DEVICE

(71) Applicant: TOYOTA JIDOSHA KABUSHIKI KAISHA, Toyota (JP)

(72) Inventors: Kazuya Okada, Arakawa-ku (JP); Hiroshi Abe, Kasukabe (JP); Naoya Kaneko, Toyota (JP); Toru Furusawa, Yokohama (JP); Takayuki Sakai, Setagaya-ku (JP); Koji Takeoka, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/796,657

(22) Filed: Aug. 7, 2024

(65) Prior Publication Data

US 2025/0172400 A1　May 29, 2025

(30) Foreign Application Priority Data

Nov. 28, 2023　(JP) ................................. 2023-201073

(51) Int. Cl.
*G01C 21/34*　(2006.01)
*G01C 21/00*　(2006.01)

(52) U.S. Cl.
CPC ..... *G01C 21/3415* (2013.01); *G01C 21/3461* (2013.01); *G01C 21/3807* (2020.08); *G01C 21/3841* (2020.08)

(58) Field of Classification Search
CPC ........................ G01C 21/3807; G01C 21/3415

USPC .......................................................... 701/411
See application file for complete search history.

(56) References Cited

U.S. PATENT DOCUMENTS

| | | | |
|---|---|---|---|
| 2020/0309553 A1 | 10/2020 | Onodera et al. | |
| 2021/0003407 A1 | 1/2021 | Sasaki et al. | |
| 2022/0014288 A1* | 1/2022 | Matsunaga | ............. H04W 4/44 |
| 2022/0316914 A1* | 10/2022 | Lenz | .................... G05D 1/0274 |

FOREIGN PATENT DOCUMENTS

| | | | |
|---|---|---|---|
| EP | 2560344 A2 | 2/2013 | |
| JP | 2009-232197 A | 10/2009 | |
| JP | 2013-081158 A | 5/2013 | |
| JP | 2014-143621 A | 8/2014 | |
| JP | 2020-165832 A | 10/2020 | |
| JP | 2021-012084 A | 2/2021 | |
| WO | WO-2024057760 A1 * | 3/2024 | ............. G01C 21/34 |

OTHER PUBLICATIONS

Machine Translation (Year: 2023).*

* cited by examiner

*Primary Examiner* — Navid Z. Mehdizadeh
*Assistant Examiner* — Vincent Feng
(74) *Attorney, Agent, or Firm* — SoraIP, Inc.

(57)　ABSTRACT

A control unit configured to perform obtaining a quality map regarding the quality of wireless communication for each planned travel route and area of the first vehicle, and transmitting an alternative route that does not pass through the first area to the first vehicle in response to the planned travel route passing through the first area whose quality of wireless communication is lower than a predetermined quality.

7 Claims, 5 Drawing Sheets

VEHICLE INFORMATION DB 321

| VEHICLE ID | DATE AND TIME | LOCATION | COMMUNICATION CIRCUIT | COMMUNICATION QUALITY |
|---|---|---|---|---|
| × × × | × × × | × × × | × × × | × × × |

INFORMATION PROCESSING DEVICE

CROSS-REFERENCE TO RELATED APPLICATION

This application claims priority to Japanese Patent Application No. 2023-201073 filed on Nov. 28, 2023, incorporated herein by reference in its entirety.

BACKGROUND

1. Technical Field

The present disclosure relates to information processing devices.

2. Description of Related Art

Efficient streaming control based on current network quality is known in the art (e.g., Japanese Unexamined Patent Application Publication No. 2013-081158 (JP 2013-081158 A)).

SUMMARY

An object of the present disclosure is to provide a technique for maintaining good network quality during the move.

An aspect of the present disclosure is an information processing device that includes a control unit configured to acquire a quality map related to quality of wireless communication for each planned travel route and area of a first vehicle, and when the planned travel route passes through a first area where the quality of the wireless communication is lower than predetermined quality, send to the first vehicle an alternative route that does not pass through the first area.

Other aspects of the present disclosure include an information processing method in which a computer executes processes in the information processing device, a program that causes the computer to execute the information processing method, and a storage medium storing the program in a non-transitory manner.

The present disclosure can provide a technique for maintaining good network quality during the move.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figures 1, 2:
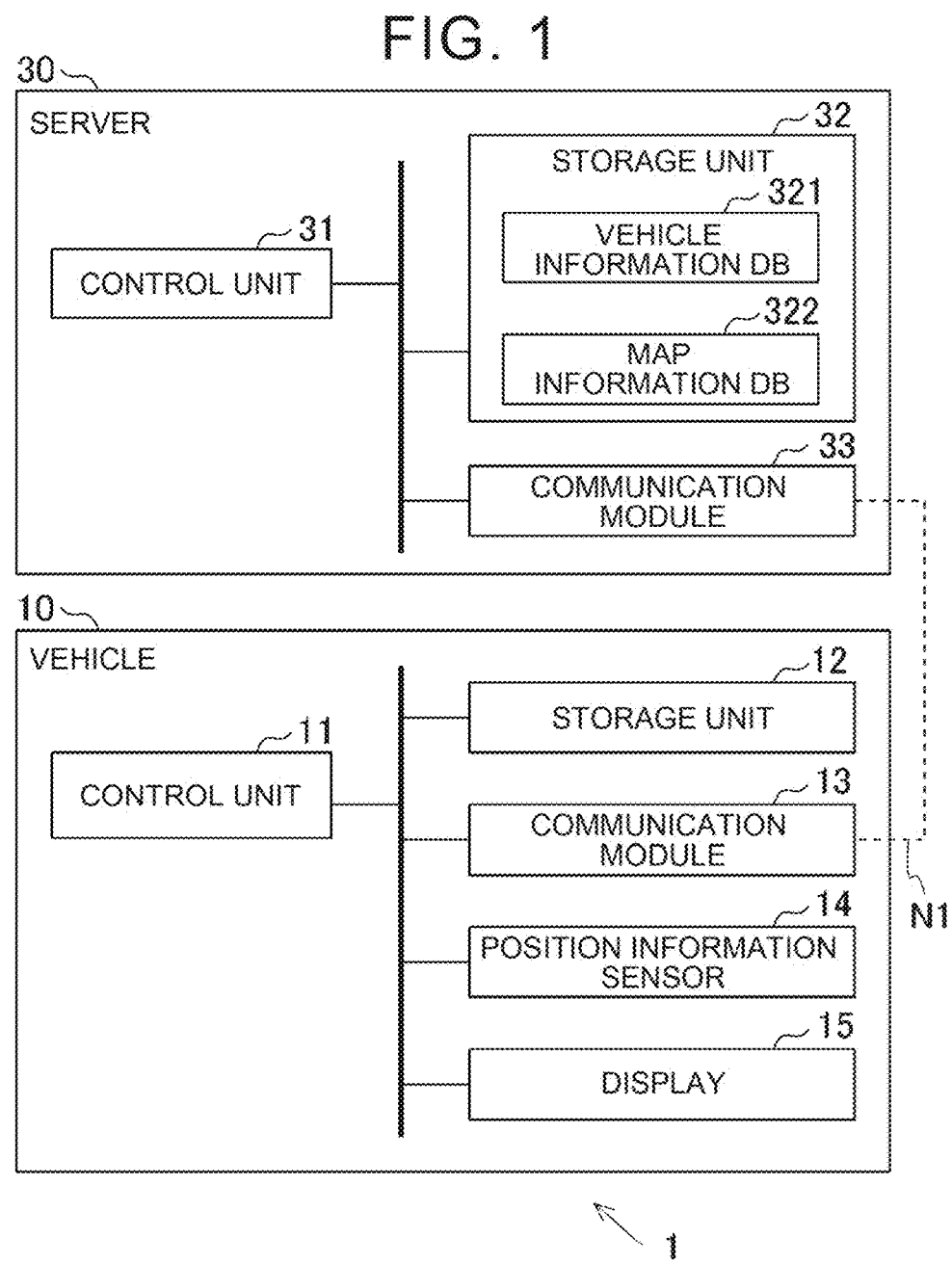
FIG. 1 is a schematic diagram of a system according to an embodiment.
FIG. 2 is a diagram illustrating a table configuration of a vehicle-information DB.

When a streaming service that transmits and receives large-capacity data such as an online video conference is used, a vehicle may move to an area where high-speed large-capacity communication cannot be performed due to difficulty in receiving radio waves in mountainous areas or tunnels. Then, the streaming service is delayed or interrupted.

Therefore, according to the present disclosure, when a vehicle is expected to pass through an area where communication quality is deteriorated based on a planned travel route of a vehicle using a streaming service and a map relating to communication quality, an alternative route in which connection is stable is searched and presented to a user. Therefore, the control unit acquires a quality map related to the quality of the wireless communication for each planned travel route and area of the first vehicle. The first vehicle is a vehicle on which a user using the streaming service is riding. The planned travel route of the first vehicle may be, for example, a route set in the car navigation system, or may be a route predicted based on the traveling route up to the current point of time and the past route history. AI may be used to predict this. The area may be, for example, an area defined by an administrative section or an area mesh, or may be an arbitrarily defined area. The quality of the wireless communication may be determined based on the data transfer rate of at least one of the downlink and uplink. These data transfer rates may be included in the probe data collected from the plurality of second vehicles. The quality map is a map generated so that at least an area in which the communication quality satisfies the required quality can be distinguished from an area in which the communication quality does not satisfy the required quality.

In addition, the control unit transmits, to the first vehicle, an alternative route that does not pass through the first area in response to the planned travel route passing through the first area where the quality of the wireless communication is lower than a predetermined quality. The predetermined quality may be a quality required for the streaming service, or may be a quality that enables wireless communication. The first area is an area in which it is difficult to use the streaming service because the quality of the wireless communication is lower than a predetermined quality. The first area may be an area in which at least one of the downlink and uplink data transfer rate is lower than the required quality and continues for a predetermined time or longer. When a vehicle passes through such a first area, the streaming service is stopped. Therefore, the control unit transmits the alternative route that does not pass through the first area to the first vehicle. The alternative route may be, for example, the shortest route among routes that can be moved from the current location of the vehicle to the destination by bypassing the first area. In this way, it is possible to prevent the quality of the wireless communication from being lower than the predetermined quality, and thus it is possible to continue to use the streaming service.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

FIG. 1 is a schematic diagram of a system 1 according to an embodiment. In the example of FIG. 1, the system 1 includes a vehicle 10 and a server 30. There may be a plurality of vehicles 10. The server 30 may include a plurality of servers. The vehicles 10 and the server 30 are connected to each other by a network N1. The network N1 is, for example, a world-wide public communication network such as the Internet, and a wide area network (WAN) or other communication networks may be adopted. In addition, the network N1 may include a telephone communication network such as a mobile phone network and a wireless communication network such as Wi-Fi (registered trademark).

The vehicle 10 is a connected car that periodically transmits information (probe data) such as a location, a communication line, and communication quality to the server 30. These pieces of information transmitted from the vehicle 10 to the server 30 are also referred to as vehicle information below. The vehicular information may include information on communication quality such as reference signal received power (RSRP), reference signal received quality (RSRQ), or signal to interference noise (SINR). In addition, the vehicle information may include information on whether or not the downlink and uplink are connected, and a data transfer rate of the downlink and uplink. Further, the vehicle information may further include information about each of the measurement location of the data transfer rate and the measurement date and time of the data transfer rate.

The server 30 generates a route having a sufficiently high communication quality and provides the route to the vehicle 10. The server 30 includes a control unit 31, a storage unit 32, and a communication module 33.

The server 30 can be configured as a computer including a processor (such as a CPU, GPU), a main storage device (such as a RAM, ROM), and a secondary storage device (such as an EPROM, a hard disk drive, and a removable medium). The auxiliary memory device has stored therein an operating system (OS), various programs, various tables, etc. By executing the program stored in the auxiliary storage device, it is possible to realize each function (software module) that matches a predetermined purpose, as will be described later. However, some or all of the modules may be realized as hardware modules by, for example, hardware circuitry such as an ASIC, FPGA.

The control unit 31 is an arithmetic unit that realizes various functions of the server 30 by executing a predetermined program. The control unit 31 can be realized by, for example, a hardware processor such as a CPU. The control unit 31 may include a RAM, ROM, a cache memory, and the like. Details of the control unit 31 will be described later.

The storage unit 32 is a unit that stores information, and is configured by a storage medium such as a RAM, a magnetic disk, or a flash memory. The storage unit 32 stores a program executed by the control unit 31, data used by the program, and the like. In addition, a data base (vehicle information DB 321 and map information DB 322) is constructed in the storage unit 32. The vehicle information DB 321 stores information collected from the vehicles 10.

The map information DB 322 stores map data including map information including geographic locations and point of interest (POI) information such as text and photographs indicating properties of respective points on the map data. Note that the map information DB 322 may be provided from another system connected to the network N1, for example, a geographic information system (GIS).

FIG. 2 is a diagram illustrating a table configuration of the vehicle information DB 321. The vehicle information DB 321 stores date-and-time information, position information, communication line information, and communication quality information in association with the vehicle ID. These pieces of information are collectively called vehicle information. The vehicle ID is identification information unique to the vehicle 10. The date-and-time information is information on the date and time when the communication quality is measured. The position information is information related to a position at which the communication quality is measured, and is, for example, information indicated by latitude and longitude. The communication line information is information related to a communication line used in the vehicle 10. The communication line information may be, for example, information related to a communication method such as 4G, 5G, Wi-Fi (registered trademark). The communication-quality information may be information about reference signal received power (RSRP), reference signal received quality (RSRQ), or signal-to-interference-plus-noise ratio (SINR). In addition, the communication quality information may include information on continuity (connected or disconnected) of communication. In addition, the communication quality information may include information on at least one of a downlink and an uplink data transfer rate. The vehicle information is periodically transmitted from the vehicle 10. The control unit 31 stores the received vehicle information in the vehicle information DB 321.

The communication module 33 is a communication interface for connecting the server 30 to the network N1. The communication module 33 may be configured to include, for example, a network interface board, a wireless communication interface for wireless communication, and the like. The server 30 can perform data communication with the vehicle 10 via the communication module 33.

Note that the specific hardware configuration of the server 30 can be omitted, replaced, or added as appropriate depending on the embodiment.

Next, the vehicle 10 will be described. The vehicle 10 includes a control unit 11, a storage unit 12, a communication module 13, a position information sensor 14, and a display 15. These configurations may be realized by a combination of a data communication module (DCM), a head unit, an in-vehicle device such as a car navigation system, and the like. The control unit 11 is an arithmetic unit that realizes various functions of the vehicle 10 by executing a predetermined program. The control unit 11 can be realized by, for example, a hardware processor such as a CPU. In addition, the control unit 11 may be configured to include a RAM, a read only memory (ROM), a cache memory, and the like.

The storage unit 12 is a unit that stores information, and is configured by a storage medium such as a RAM, a magnetic disk, or a flash memory. The storage unit 12 stores a program executed by the control unit 11, data used by the program, and the like.

The communication module 13 is a communication unit for connecting the vehicles 10 to the network N1. In the present embodiment, vehicles 10 can communicate with other devices (for example, server 30) over a network N1 using a mobile communication service such as 3G, LTE, 5G, 6G. The communication module 13 is an example of a wireless device. The position information sensor 14 acquires position information (for example, latitude and longitude) of the vehicle 10 at a predetermined cycle. The position information sensor 14 is, for example, a global positioning system (GPS) receiver, a wireless communication unit, or the like. The display 15 is a device for presenting data to a user, such as a liquid crystal display (LCD) or an Electroluminescence (EL) panel. Note that the display 15 may be configured as a touch panel display.

The control unit 11 of the vehicle 10 collects vehicle information at predetermined time intervals and transmits the collected vehicle information to the server 30. The control unit 11 of the vehicle 10 is configured to be able to use a streaming service. For example, the control unit 11 of the vehicle 10 is configured to be capable of executing an online conference. The control unit 11 of the vehicle 10 transmits the travel route of the vehicle 10 to the server 30. For example, when the travel route is guided in the car navigation system, the guided travel route and destination are transmitted to the server 30. The vehicle 10 includes, for example, a microphone and a speaker required for an online conference. In addition, the control unit 11 of the vehicle 10, upon receiving the information on the alternative travel route from the server 30, performs guidance according to the alternative travel route. For example, an alternative travel route may be presented to the user by being displayed on the display 15.

Next, the control unit 31 of the server 30 will be described in detail. The control unit 31 of the server 30 generates a quality map related to the quality of the wireless communication based on the vehicle information collected from the plurality of vehicles 10. The quality map may be generated for each area and for each time. The "every hour" may be classified into a day of the week, a weekday and a holiday, a time zone (daytime, nighttime, midnight, and the like), and the like.

Figure 3:
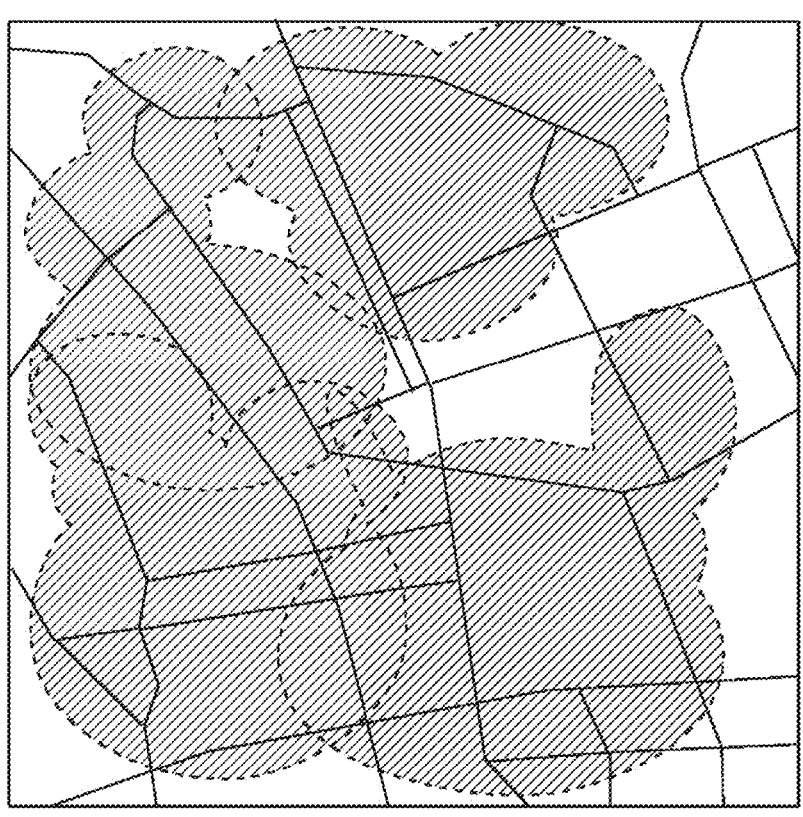
FIG. 3 is a diagram illustrating an example of a quality map.

FIG. 3 is a diagram illustrating an example of a quality map. FIG. 3 is a diagram illustrating an area in which the quality of wireless communication is equal to or higher than a predetermined quality on a map. In FIG. 3, an area in which the quality of wireless communication is equal to or higher than a predetermined quality is surrounded by a broken line. As a result, a boundary between an area where the communication quality is equal to or higher than the predetermined quality and an area where the communication quality is lower than the predetermined quality is defined by a broken line. In FIG. 3, the hatched area is an area where the communication quality is equal to or higher than the predetermined quality. The area other than the hatched area is an area where the communication quality is less than the predetermined quality, and is hereinafter also referred to as the first area. The predetermined quality in the communication quality may be set such that at least one of the reference signal reception power RSRP, the reference signal reception quality RSRQ, and the signal-to-interference-wave noise-ratio SINR is equal to or greater than the required value. The quality map may also be, for example, a map that separates areas where the data transfer rate of at least one of the uplink and downlink is less than the predetermined quality and areas where the data transfer rate continues for a predetermined time or longer, and areas that do not. The predetermined time period may be a time period in which a trouble occurs in providing the streaming service. Also, the predetermined quality may be different between the uplink and the downlink. After generating the quality map, the control unit 31 stores the quality map in the storage unit 32. The quality map may be generated in advance and stored in the storage unit 32, or may be generated every time a travel route is acquired from the vehicle 10.

In addition, the control unit 31 determines whether or not the traveling route passes through the first area on the quality map in response to the acquisition of the information on the traveling route of the vehicle 10 while the streaming service is being used. The travel route at this time may be, for example, a route being guided by the car navigation system, or a route predicted by using AI from the current location and the previous travel history. In response to determining that the travel route passes through the first area on the quality map, the control unit 31 generates a new travel route that bypasses the first area and transmits the new travel route to the vehicle 10. At this time, a command for performing guidance according to the newly generated travel route may be transmitted. Furthermore, a command for displaying the newly generated travel route on the display 15 of the vehicle 10 may be transmitted.

Further, the control unit 31 may determine whether or not to use the streaming service in the vehicle based on, for example, a schedule of the user of the vehicle 10. The schedule of the user of the vehicle 10 may be managed by an external server. The server 30 may provide a streaming service or manage a schedule of users. Further, the server 30 may acquire the schedule of the user from the external server, or the vehicle 10 may acquire the schedule of the user from the external server and transmit the schedule acquired by the vehicle 10 to the server 30. Also, when the end time of the online conference is approaching, the user may be asked whether to end the conference as scheduled or extend the conference. If the conference is to be extended, the extension time may be queried. In addition, in a case where an online conference that is not in the schedule is being held, it may be estimated that the online conference continues for a predetermined time (for example, 30 minutes).

Then, for example, in a case where there is a schedule of an online conference or in a case where an online conference has already been held until the vehicle 10 arrives at the destination, a traveling route in which the communication quality becomes equal to or higher than a predetermined quality is generated and transmitted to the vehicle 10.

Figure 4:
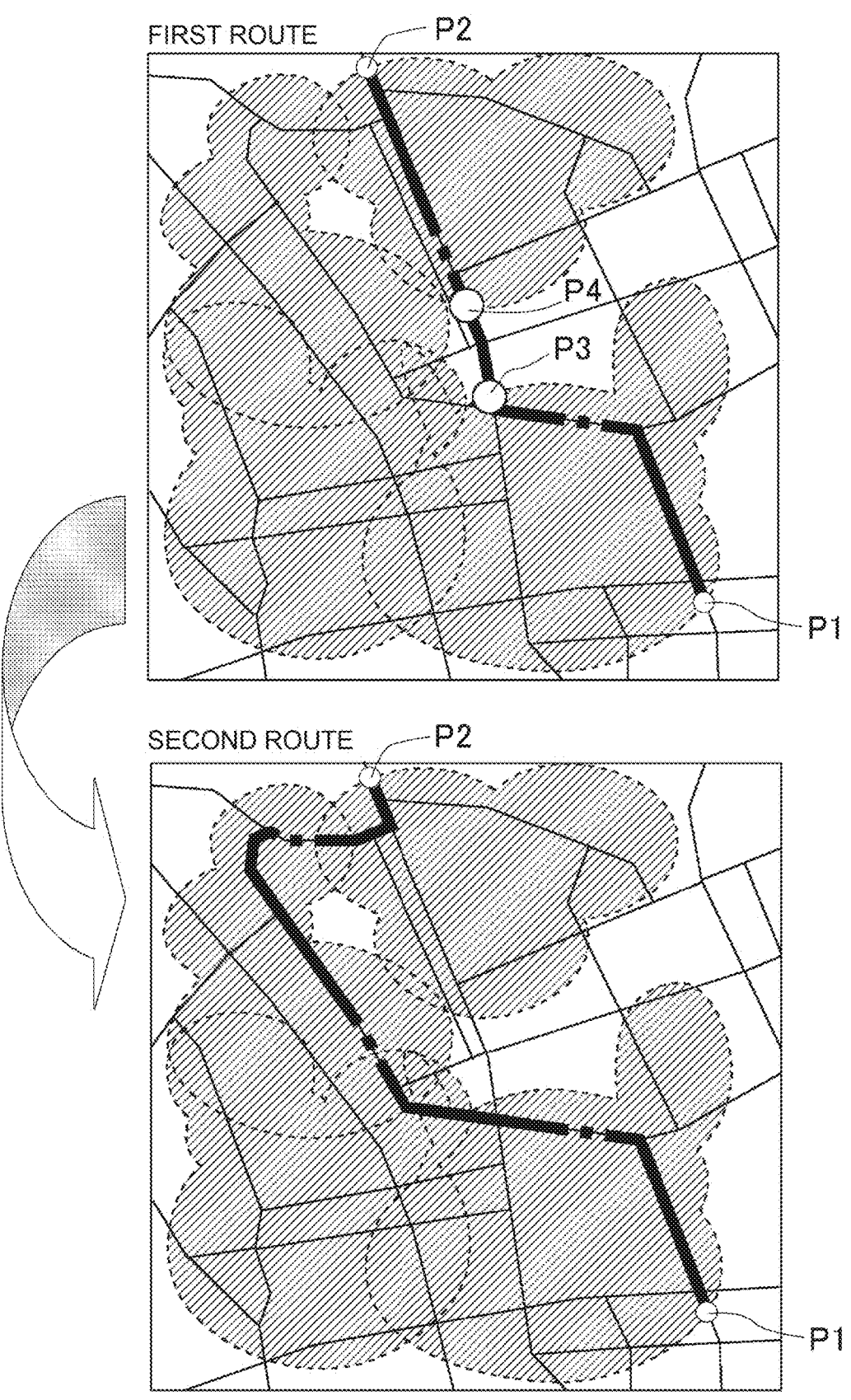
FIG. 4 is a diagram illustrating a change in a travel route.

FIG. 4 is a diagram illustrating a change in a traveling route. The first route indicates the travel route before the change, and the second route indicates the travel route after the change. In FIG. 4, the first path and the second path are indicated by dashed-dotted lines. A situation where the vehicles 10 move from the point indicated by P1 to the point indicated by P2 will be described. The first route is generated by the control unit 11 of the vehicle 10 on the basis of, for example, the position of P1 which is the current position, the position of P2 which is the destination, and the map information stored in the map information DB 322. The first route is generated so as to be a route according to a predetermined rule such as a route in which the travel distance of the vehicle 10 is shortest, a route in which the travel time of the vehicle 10 is shortest, and the like. The first route may be generated by the control unit 11 of the vehicle 10 or may be generated by the control unit 31 of the server 30.

In the first route, the communication quality is less than the predetermined quality in a section from the point indicated by P3 on the traveling route to the point indicated by P4. Therefore, there is a possibility that the streaming service cannot be received while the vehicle 10 is traveling during this period. Therefore, the control unit 31 generates the second path so as to bypass the section from P3 to P4. The second path is, for example, a path that passes only in an area where the communication quality is equal to or higher than the predetermined quality, and the travel distance or travel time from P1 to P2 is the shortest. The second path is generated by the control unit 31 of the server 30.

Figure 5:
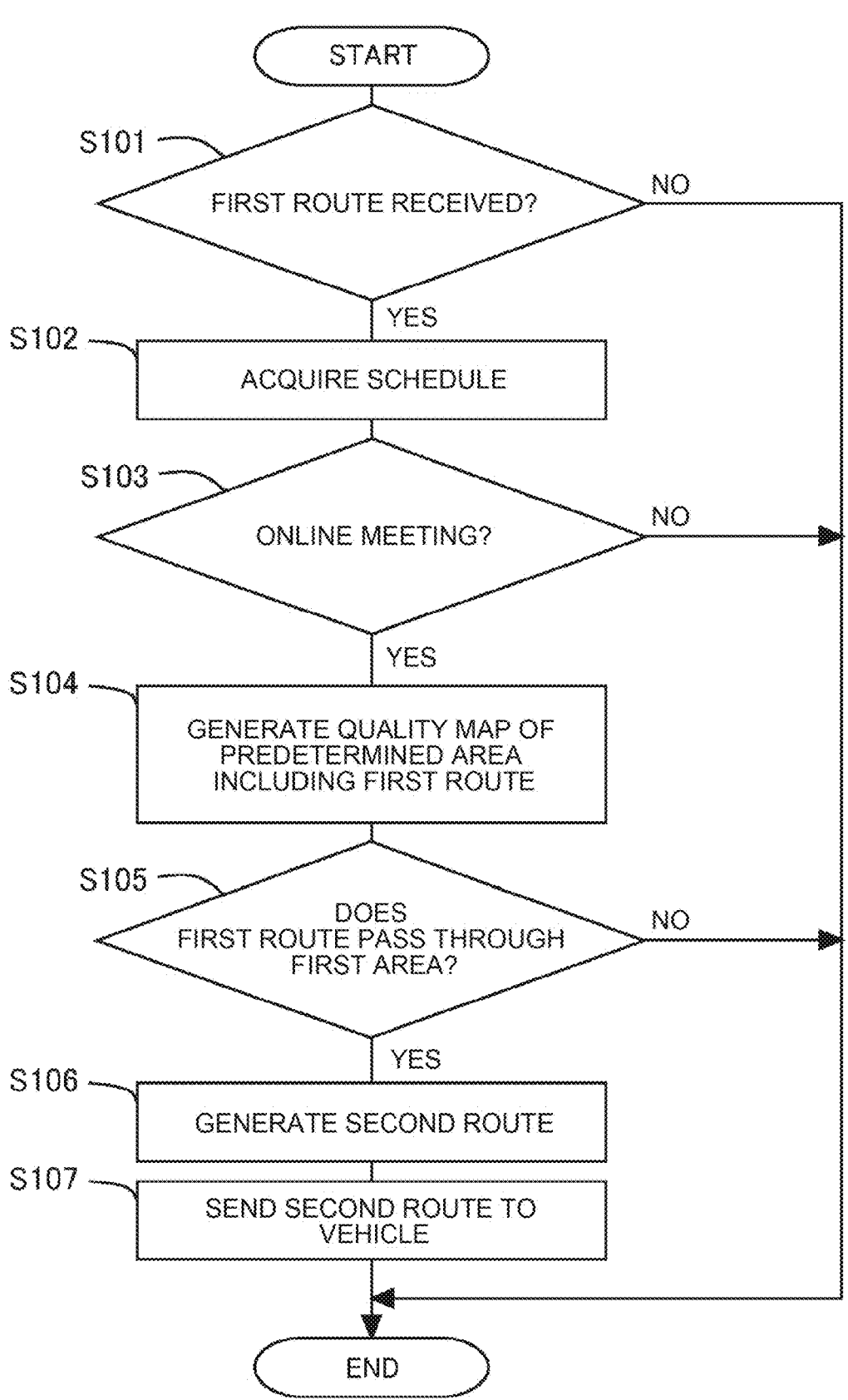
FIG. 5 is a flow chart showing a process of transmitting information on an alternative travel route from the server to the vehicle according to the first embodiment.

FIG. 5 is a flowchart illustrating a process of transmitting information on an alternative travel route from the server 30 to the vehicle 10 according to the first embodiment. The flowchart illustrated in FIG. 5 is executed in the server 30 at predetermined time intervals. It is to be noted that the vehicle information DB 321 and the map information DB

322 will be described on the assumption that the required information is already stored.

In S101, the control unit 31 determines whether or not the first route has been received from the vehicles 10. For example, when the user inputs a destination in the car navigation system, the control unit 11 of the vehicle 10 searches for a travel route from the current location to the destination. When the travel route is determined, the control unit 11 of the vehicle 10 transmits the first route to the server 30. If the control unit 31 makes an affirmative determination in S101, the process proceeds to S102, and if a negative determination is made, the routine ends.

In S102, the control unit 31 acquires the schedule of the user. This calendar is an online managed calendar. This calendar is associated with, for example, a vehicle ID, and the control unit 31 acquires a calendar corresponding to the vehicle ID from the external servers. In this calendar, for example, the holding time of the online conference is stored.

In S103, the control unit 31 determines whether or not an on-line conference is performed. The online conference is an online conference performed on the first route. For example, when it is assumed that the vehicle 10 travels on the first route, the control unit 31 predicts a time at which the vehicle arrives at the destination. At this time, the control unit 31 may predict the arrival time to the destination in consideration of the congestion information and the like. Note that this prediction may be performed on the car navigation system by the control unit 11 of the vehicle 10 and transmitted to the server 30. Then, the control unit 31 determines whether there is an online conference started before the time at which the vehicle 10 arrives at the destination. Note that the control unit 31 may determine whether or not there is a plan to use the streaming service in addition to the online conference. Then, the control unit 31 makes an affirmative determination in S103 in response to the presence of an on-line conference started prior to the time at which the vehicles 10 arrive at the destination. If the control unit 31 makes an affirmative determination in S103, the process proceeds to S104, and if a negative determination is made, the routine ends. Note that the control unit 31 makes an affirmative determination not only when an online conference is scheduled to be held in the future, but also when an online conference is currently held.

In S104, the control unit 31 generates a quality map of a predetermined area including the first route. The predetermined area is an area where the vehicle 10 may pass when going to a destination. For example, the control unit 31 may generate a quality map of an area within a predetermined distance from the first route. Note that the control unit 31 may generate a quality map and store it in the storage unit 32 in advance. Then, in S104, the control unit 31 may refer to the quality map of the predetermined area including the first route from the storage unit 32.

Further, the quality map may be generated by the control unit 31 according to the time at which the online conference is scheduled. For example, a quality map may be generated based on vehicle information collected on the same day of the week. Further, if the online conference is held on weekdays, a quality map may be generated based on vehicle information collected on weekdays, and if the online conference is held on holidays, a quality map may be generated based on vehicle information collected on holidays. Further, the quality map may be generated based on the vehicle information collected in the same time period as the time period in which the online conference is performed. This time period may be divided by, for example, daytime, nighttime, midnight, or the like, or may be divided every hour, for example.

In S105, the control unit 31 determines whether or not the first route passes through the first area. If the control unit 31 makes an affirmative determination in S105, the process proceeds to S106, and if a negative determination is made, the routine ends.

In S106, the control unit 31 generates a second path. The control unit 31 generates a second route in which the vehicle 10 does not pass through the first area based on the current location of the vehicle 10, the destination of the vehicle 10, and the quality map.

In S107, the control unit 31 transmits information about the second route to the vehicles 10. The information transmitted by the control unit 31 at this time may include a command for displaying the second route on the display 15 of the vehicle 10.

As described above, according to the present embodiment, in a case where it is predicted to pass through the first area where it is difficult to receive the streaming service, it is possible to present the second route that bypasses the first area to the user. As a result, the stop of the streaming service is suppressed, so that the user can continue to use the streaming service.

Second Embodiment

In the second embodiment, the control unit 31 of the server 30 inquires the user whether or not to switch from the first route to the second route, and when the user desires to switch to the second route, the control unit 31 of the server 30 transmits the second route to the vehicle 10.

The control unit 31 calculates a difference (hereinafter, also referred to as an increase time) between a time when communication is interrupted (hereinafter, also referred to as an interruption time) when the vehicle 10 is assumed to travel on the first route, a traveling time when the vehicle 10 is assumed to travel on the second route, and a traveling time when the vehicle 10 is assumed to travel on the first route, and transmits the calculated difference to the vehicle 10. The control unit 31 calculates the dead time as the time required for the vehicle 10 to pass through the first area. The increase time is an increase in the travel time when switching from the first route to the second route. For example, if the disruption time is an acceptable time for the user, the user may select a short-range first path. If the increase time is too long, the user may select the first route. Therefore, the information necessary for the user to determine whether to switch from the first route to the second route is transmitted to the vehicle 10.

The control unit 11 of the vehicle 10 notifies the user that the interruption time and the increase time have been received, and inquires of the user whether or not to switch to the alternative travel route. Then, when the user desires to switch to the alternative travel route, the control unit 11 notifies the server 30 of the fact. For example, when the user taps a predetermined button displayed on the display 15, the control unit 11 determines that the user desires to switch the travel route.

Figure 6:
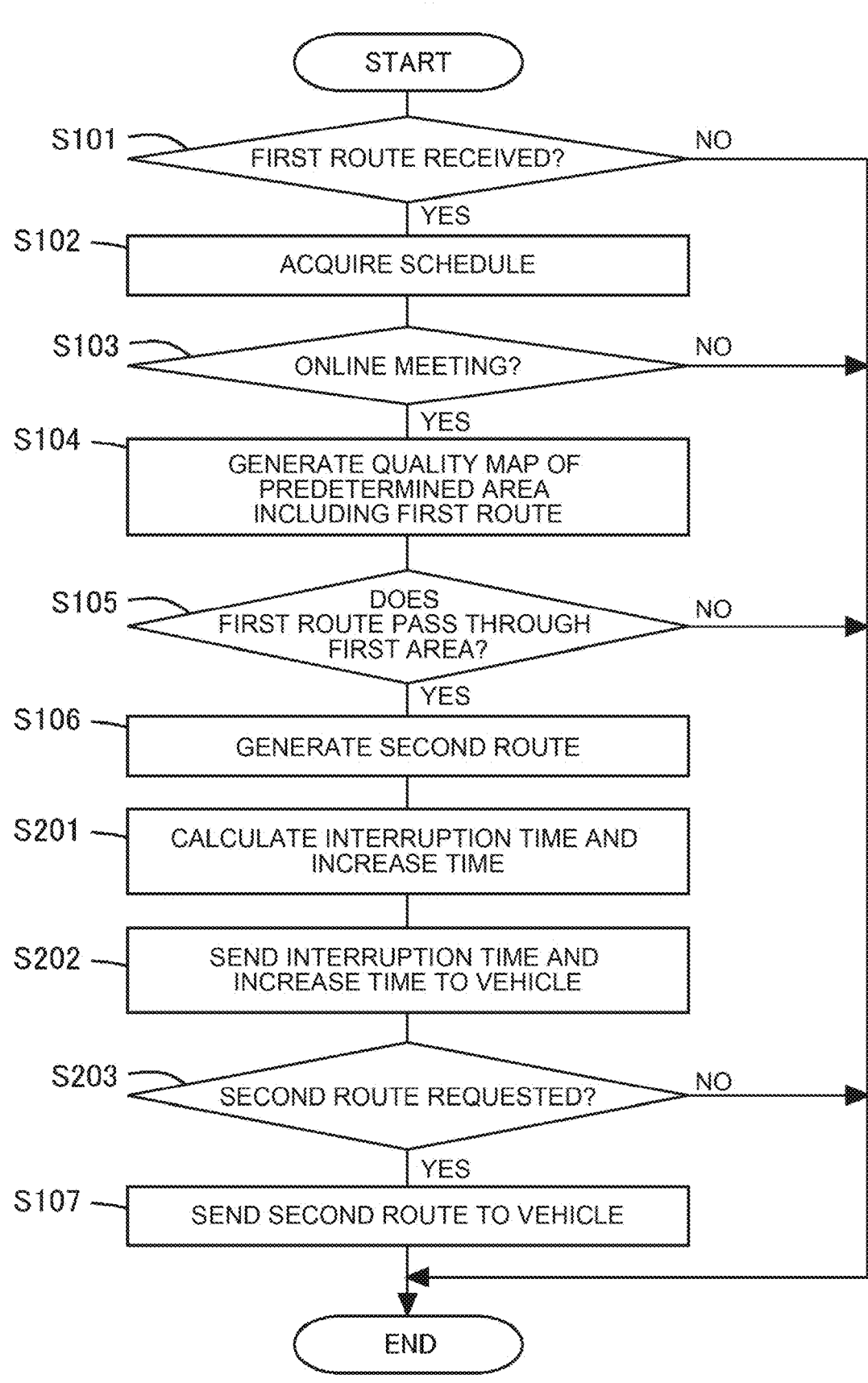
FIG. 6 is a flowchart illustrating a process of transmitting information on an alternative travel route from the server to the vehicle according to the second embodiment.

FIG. 6 is a flowchart showing a process of transmitting information on an alternative travel route from the server 30 to the vehicle 10 according to the second embodiment. The flowchart illustrated in FIG. 6 is executed in the server 30 at predetermined time intervals. It is to be noted that the vehicle information DB 321 and the map information DB 322 will be described on the assumption that the required information is already stored. In FIG. 6, the steps in which the same processing as the flowchart shown in FIG. 5 is executed are denoted by the same reference numerals, and the description thereof is omitted.

In the flow chart shown in FIG. 6, when the control unit 31 completes S106 process, the process proceeds to S201. In S201, the control unit 31 calculates the interruption time and the increasing time. These times are calculated as the time required to travel the target distance. For example, the time required to travel the target distance can be calculated based on the average speed of the vehicle 10 and the target distance. The average speed of the vehicle 10 may be calculated based on the position information of the plurality of vehicles 10 traveling on the same road in the past.

In S202, the control unit 31 transmits the calculated interruption time and the calculated increase time to the vehicles 10. At this time, the control unit 31 may transmit a plurality of commands to the vehicle 10. The plurality of commands is a command for displaying the interruption time and the increase time on the display 15, a command for displaying an inquiry as to whether or not to switch to the second path on the display 15, and a command for transmitting an answer to the inquiry to the server 30. Upon receiving the interruption time and the increase time from the server 30, the control unit 11 of the vehicle 10 causes the display 15 to display an inquiry as to whether or not to switch to the second route. The user may answer whether or not to switch to the second route by tapping or speaking at a predetermined location on the display 15. The control unit 11 of the vehicle 10 transmits the response of the user to the server 30.

In S203, the control unit 31 determines whether or not the user's answer received from the vehicle 10 is an answer that desires the second route. If the control unit 31 makes an affirmative determination in S203, the process proceeds to S107, and if a negative determination is made, the routine ends. When there is no answer from the vehicles 10, the control unit 31 may make a negative determination in S203.

In the flow chart shown in FIG. 6, in S202, the control unit 31 transmits the interruption time and the increase time to the vehicle 10, but as another example, the control unit 31 may transmit either one of the interruption time and the increase time to the vehicle 10. In addition, in S202, the control unit 31 may also transmit information about the second route to the vehicles 10, and terminate the routine illustrated in FIG. 6. In this case, in response to a desire to switch from the first route to the second route from the user, the control unit 11 of the vehicle 10 may switch to the second route that has already been received.

As described above, according to the present embodiment, the detour is set when the user desires. For example, the user may wish to shorten the travel time rather than receiving the streaming service. In such a case, if the travel route is uniformly changed, it may be inconvenient for the user. On the other hand, in the second embodiment, since the detour is set only when the user desires, the convenience of the user can be improved.

Other Embodiments

The above-described embodiment is merely an example, and the present disclosure may be appropriately modified and implemented without departing from the scope thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

For example, in the above-described embodiment, the control unit 31 of the server 30 generates an alternative travel route, but as another example, the control unit 11 of the vehicle 10 may generate an alternative travel route. In this case, the control unit 31 of the server 30 may generate a quality map and provide it to the vehicle 10.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media include, for example, any type of disk, such as a magnetic disk, an optical disk, etc. The magnetic disk is a floppy (registered trademark) disk, a hard disk drive (HDD), or the like. The optical disc is a CD-ROM, DVD disc, a Blu-ray disc, or the like. Non-transitory computer-readable storage media also include, for example, read only memory (ROM), random access memory (RAM), EPROM, EEPROM, magnetic cards, flash memory, optical cards. Also, non-transitory computer-readable storage media include any type of media suitable for storing electronic instructions.

What is claimed is:

1. An information processing device comprising a processor configured to
   acquire a planned travel route of a first vehicle to a destination,
   acquire schedule information of a user of the first vehicle, the schedule information including a schedule of an online conference,
   acquire a quality map related to quality of wireless communication for a plurality of areas,
   determine whether the planned travel route passes through a first area of the quality map, the first area being an area where the quality of the wireless communication is lower than predetermined quality,
   determine whether the online conference starts before the first vehicle arrives at the destination, and
   send to the first vehicle a second route in a case where the planned travel route passes through the first area and the online conference starts before the first vehicle arrives at the destination, the second route being a route that does not pass through the first area.

2. The information processing device according to claim 1, wherein the first area is an area where a data transfer rate for either or both of downlink and uplink continues to be lower than the predetermined quality for a predetermined time or more.

3. The information processing device according to claim 1, wherein the processor is further configured to
   collect probe data regarding a data transfer rate for downlink and uplink from a plurality of second vehicles, and
   generate the quality map regarding the downlink and the uplink, based on the collected probe data.

4. The information processing device according to claim 3, wherein the probe data includes at least one of pieces of data that are periodically sent from wireless devices mounted on the plurality of second vehicles, the pieces of data being reference signal received power, reference signal received quality, and signal-to-interference-plus-noise ratio.

5. The information processing device according to claim 3, wherein:

the probe data further includes information about a measurement location of the data transfer rate and a measurement date and time of the data transfer rate; and the processor is configured to generate the quality map for each time period.

6. The information processing device according to claim 1, wherein the processor is further configured to calculate an interruption time, the interruption time being time required for the first vehicle to pass through the first area in a case where the vehicle is assumed to travel on the first route, and notify the user of the interruption time via a display of the first vehicle.

7. The information processing device according to claim 1, wherein the processor is further configured to calculate a time difference between a first traveling time and a second traveling time, the first traveling time being time required to reach the destination via the first route, the second traveling time being time required to reach the destination via the second route, and notify the user of the time difference via a display of the first vehicle.

* * * * *